Feb. 3, 1970 H. R. FOGLIA 3,493,931

DIODE-STEERED MATRIX SELECTION SWITCH

Filed April 16, 1963 3 Sheets-Sheet 1

INVENTOR
HENRY R. FOGLIA

BY S. P. Tedesco
ATTORNEY

United States Patent Office
3,493,931
Patented Feb. 3, 1970

3,493,931
DIODE-STEERED MATRIX SELECTION SWITCH
Henry R. Foglia, Briarcliff Manor, N.Y., assignor to International Business Machines Corporation, New York, N.Y., a corporation of New York
Filed Apr. 16, 1963, Ser. No. 273,337
Int. Cl. H04q *1/00, 3/00*
U.S. Cl. 340—166 14 Claims This invention relates to magnetic core memory arrays, and more particularly, to improved matrix selection switch arrangements comprising semiconductor devices for insertion, i.e., writing, and retrieval, i.e., reading of information in such arrays.

The need for addressable memory systems having large storage capacity and fast access times in information processing systems has dictated extensive development of magnetic core memory arrays. In such memory arrays, magnetic core elements constituting the basic memory cells are generally toroidal in shape and formed of material exhibiting substantially rectangular characteristics. Magnetic cores are well suited for such purposes due to their ability to permanently store binary "bits" of information in the form of distinct, stable states of remanent magnetization. With the advent of large capacity magnetic core memory arrays, the addressing or access problem, i.e., effecting a read or write operation at a particular word address, has increased in complexity. Two general techniques are available for addressing a magnetic core array, two-dimensional or linear word selection and three-dimensional or bit coincident selection. Such techniques reflect substantial differences in the complexity of instrumentation required to address the magnetic core memory array and the operational speed (cycle time) of the memory system. Basically, linear word selection requires a matrix function external to the magnetic core memory array as opposed to coincident selection wherein the core array itself performs the matrix function. A coincident selection technique is more efficient to instrument as the storage capacity (words) of the memory system increases. Higher operational speeds, however, tend to offset the more complex instrumentation required by linear selection techniques. This speed factor is principally associated with the time required to transmit electromagnetic energy through the assemblage of memory and transmission media, e.g. drive and sense lines. In general, this phenomenon is referred to as propagation velocity and is typically in the order of 0.2 millimicrosecond/inch. Linear selection techniques provide for substantially less propagation delay by virtue of the shorter lengths of transmission media and are generally preferred in fractional microsecond memory systems.

The need for increased storage capacity in present day computer systems, however, is overbalanced by the requirement of reliability and very fast access times. If reliability is to be maintained, the net effect of magnetic disturbances generated in the magnetic core memory array during READ and WRITE operations must be minimized so as not to destroy information stored at unselected word addresses and also allow proper reading or writing of information at a selected word address. The magnitude of these magnetic disturbances set a practical limit on the capacity of a magnetic core memory array. One source of magnetic disturbance, for example, is the non-rectangular hysteresis characteristics of the material forming the magnetic core elements whereby reversible excursions from a point of magnetic remanence generate "shuttle" or noise signals along the coupled transmission media. Magnetic disturbances generated during READ and WRITE operations by linear selection techniques are localized whereby the cumulative effects of such disturbances do not limit the capacity and operational speed of a two-dimensional magnetic core memory array.

Addressing a high-speed magnetic core memory array, whether two-dimensionally or three-dimensionally organized, requires some instrumentation for driving a plurality of drive lines on a selective basis with current pulses of very fast rise time. Drive current pulses of fast rise time insure arge sense signals in the coupled sensing means upon reversal or magnetization of driven magnetic cores during a READ operation. It can be appreciated that the magnitude of the coupled sense signal is a function of the rate at which the magnetization of a driven magnetic core is reversed, i.e. the rate of change of flux coupling the sensing means. Generally, matrix selection switches are employed to selectively direct drive signals generated externally of the magnetic core array on a selective basis along a plurality of drive lines which thread the constituent cores of a memory array on a row, column, or plane basis.

A principal object of this invention, therefore, is to provide a novel matrix selection switch employing semiconductor diode devices for directing drive signals of fast rise time along a plurality of drive lines on a selective basis.

Another object of this invention is to provide a diode-steered matrix selection switch for driving on a selected basis a plurality of drive lines which are effectively decoupled one from the other so as to reduce capacitive loading effects whereby the operational speed of the magnetic core memory array is increased.

Another object of this invention is to provide diode-steered matrix selection switches for selectively directing drive signals along a plurality of output means on a selected basis, the said selection switch being effective to increase the rise and/or the decay times of said drive signals.

Another object of this invention is to provide a high power efficiency diode-steered matrix selection switch which, when energized, minimizes electromagnetic disturbances within a driven memory array.

In prior art switching arrangements of the general type to which this invention is related, advantage is made of the ability of slow-recovery semiconductor diodes to support a charge transfer phenomenon and conduct reverse current subsequent to a period of forward conduction due to the presence of free minority carriers in the base region. For example, a prior art diode-steered matrix selection switch has been shown and described in the article "Diode-Steered Magnetic-Core Memory," by A. Melmed et al., IRE Transactions on Electronic Computers, December 1959, pp. 474–478. A basic disadvantage of prior art systems, however, is that the plurality of loads, i.e. drive lines in a magnetic core memory array, are not sufficiently decoupled to minimize stray capacitance effects whereby the high operational speeds required in present-day information processing systems are unobtainable.

In accordance with one illustrative embodiment of this invention, the novel matrix selection switch comprises a plurality of charging drive lines and a plurality of gating drive lines arranged in coordinate fashion and interconnected at each crossover point by a semiconductor diode gating arrangement. Each diode gating arrangement comprises a slow-recovery storage or charging diode and a fast-recovery shorting diode connected in series at the crosspoint; in addition, the junction of the charging and shorting diodes is connected along a fast-recovery isolating diode to an associated drive line threading magnetic cores defining either a word address in a two-dimensional core array or a core plane in a three-dimensional core array. The shorting diode and the isolating diode are poled with respect to the charging diode to pass forward current and reverse current, respectively, directed through the latter during the charging phase and the driving phase, respectively, of the gating arrangement. The required number of semiconductor diodes in a matrix selection switch, however, can be substantially reduced in accordance with other aspects of this invention by employing common shorting and/or isolating diodes for gating arrangements arranged in distinct rows of the matrix selection switch.

During the quiescent state of the matrix selection switch, the charging, shorting, and isolating diodes in each of the gating arrangements are reverse biased. A two phase operation is necessary to selectively energize a particular drive line. During the first or charging phase, the associated gating arrangement is initially charged by coincidently energizing the appropriate gating and charging drive lines to forward bias the charging and shorting diodes, the resulting forward current being effective to "charge" the charging diode. During the charging phase, the isolating diode is reverse biased such that the associated drive line does not define the charging current path and is undisturbed. To energize the associated drive line, the gating drive line is normalized and the charging drive line is energized by a drive current signal, either full-select or half-select, during the recovery time of the charging diode to induce reverse current flow therethrough. During the driving phase, the shorting diode is reverse biased such that the reverse current through the charging diode is passed as forward current through the isolating diode to energize the associated drive line. The charge stored in the charging diode during the charging phase is at least sufficient to support reverse current flow therethrough during the driving phase.

In accordance with other aspects of this invention, the shorting diode is selected to exhibit a substantially discontinuous reverse cutoff transition and have a recovery time substantially equal to the rise time of the drive current signal whereby the rise time of a drive signal directed along the associated drive line is materially improved. During the charging phase, therefore, the shorting diode is charged concurrently with the charging diode. While charged, the shorting diode exhibits a low reverse impedance or "short" during the rise time of the drive signal passed as reverse current through the charging diode. When the shorting diode recovers and exhibits a high reverse impedance, the isolating diode is forward biased; accordingly, the rise time of the drive current signal as applied along the associated drive line is determined by the reverse cutoff transition of the shorting diode. Also, the decay time of the drive current signal along the associated drive line is materially improved in a similar fashion when the charging diode is selected to exhibit a substantially discontinuous reverse cutoff transition and have a recovery time less than the duration of the drive current signal. Also, and in accordance with another aspect of this invention, the selected gating arrangement is adapted to direct bipolar drive signals along the associated drive line when a slow-recovery diode is also utilized as the isolating diode. In such event, the isolating diode is charged by the drive signal of first polarity directed therethrough in a forward direction during a preceding driving phase. During the recovery time of the isolating diode, a drive signal of opposite polarity applied along the charging drive line passes in a forward direction through the charging diode and in a reverse direction through the "charged" isolating diode to energize the associated drive line in a reverse direction. At this time, the quiescent voltage along the gating drive line maintains the shorting diode in a reverse biased condition.

The foregoing and other objects, features and advantages of the invention will be apparent from the following more particular description of preferred embodiments of the invention, as illustrated in the accompanying drawings.

Figure 1:
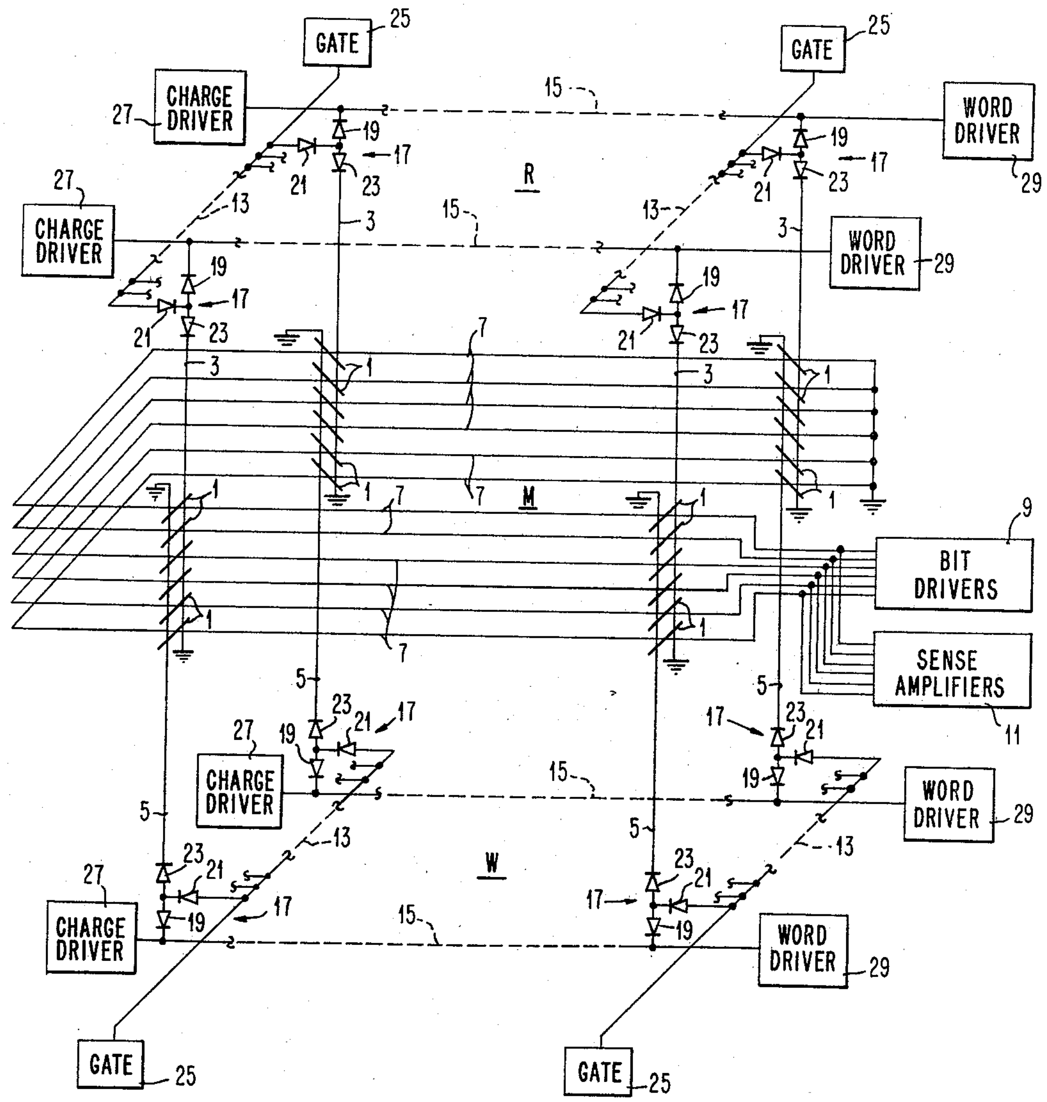
FIG. 1 shows one specific embodiment wherein matrix selection switches in accordance with the invention are coupled to a magnetic core memory array.

With reference to the drawings, and, more particularly, to FIG. 1, separate READ and WRITE matrix selection switches R and W in accordance with the principles of this invention are adapted to drive a two-dimensional or word-organized magnetic core memory array M. For purposes of clarification, only a representative portion of each of the matrix selection switches R and W and memory array M are illustrated in FIG. 1. Memory array M comprises a plurality of planes or rectangular arrays each including a plurality of columns of square-loop magnetic core elements 1 defining individual word addresses. Cores 1 defining each word address are threaded on a single-turn basis and in a first direction by a READ word drive line 3 and in an opposite direction by a WRITE word drive line 5. In addition, corresponding cores 1 in a same bit position of each word address are threaded on a single-turn basis by a bit-sense drive line 7. WRITE word drive lines 5 and bit-sense lines 7 thread each of the cores 1 in a same direction such that magnetomotive forces generated thereby when energized coincidently are additive and exceed the coercive force or threshold of the commoned core 1. Each bit-sense line 7 is multiplied to the output of a constant current bit driver 9 and into the input of a sense amplifier 11. Bit drivers 9 can be of conventional type and operative to generate positive current, half-select drive signals. Similarly, sense amplifiers 11 can be of conventional type and are adapted to be strobed during each READ operation to register sense signals induced along the connected bit-sense lines 7.

The arrangement of core 1, READ and WRITE drive lines 3 and 5, bit-sense lines 7, bit drivers 9 and sense amplifiers 11 define a conventional word-organized memory array; accordingly, conventional linear selection techniques can be employed for inserting and retrieving information, for example, on a destructive basis, from magnetic core memory array M. For example, to read information from a particular word address, the corresponding READ word drive line 3 is energizel by a positive current, full-select drive signal to switch each threaded core 1 from a remanent "1" state to a remanent "0" state whereby a transient sense signal is induced along the coupled bit-sense line 7; cores 1 in an original remanent "0" state are only shuttled whereby no sense signal is induced along the coupled bit-sense line 7. Also, to write information in a particular word address, positive current, half-amplitude drive signals are directed coincidently along the corresponding WRITE word drive line 5 and selected bit-sense lines 7 corresponding to bit positions whereat information is to be stored to switch the commoned core 1 to a remanent "1" state. Energization of either WRITE drive line 5 or bit-sense line 7 is singularly ineffective to generate sufficient magnetomotive force to switch a threaded core 1. In such event, the threaded core 1 is only shuttled and returns to a remanent "0" state upon termination of the half-amplitude drive signal. When destructive readout techniques are employed, a READ and a WRITE operation are effected sequentially to restore information in the word address.

As illustrated, READ and WRITE diode-steered matrix selection switches R and W each comprising a plurality of gating drive lines 13 and charging drive lines 15 arranged in a coordinate array to define a plurality of crosspoints corresponding one to each word address in the memory array M. A semiconductor diode gating arrangement 17 is connected between each crossover point defined between a gating drive line 13 and a charging drive line 15. Also, a constant voltage driver 25 is connected to each gate driver 13; a constant current charge driver 27 and a constant current word driver 29 are connected at the extremities of each charging drive line 15.

Figure 2:
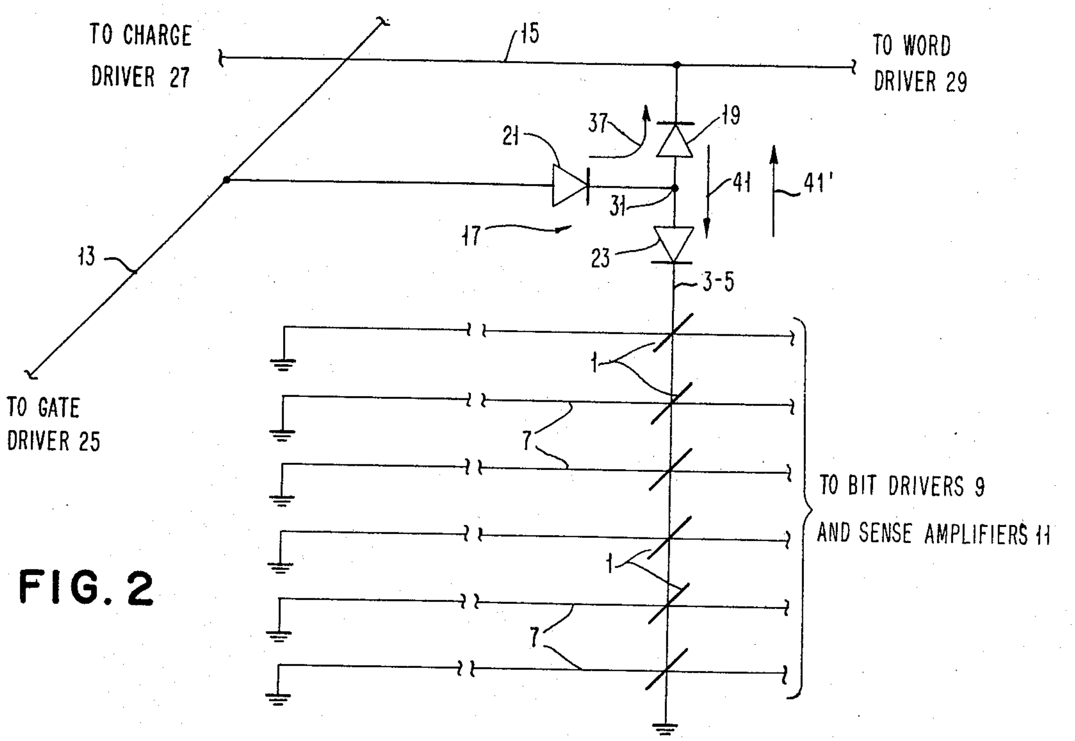
FIG. 2 shows a single diode gating arrangement for purposes of describing the matrix selection switches of FIG. 1.
Figure 3:
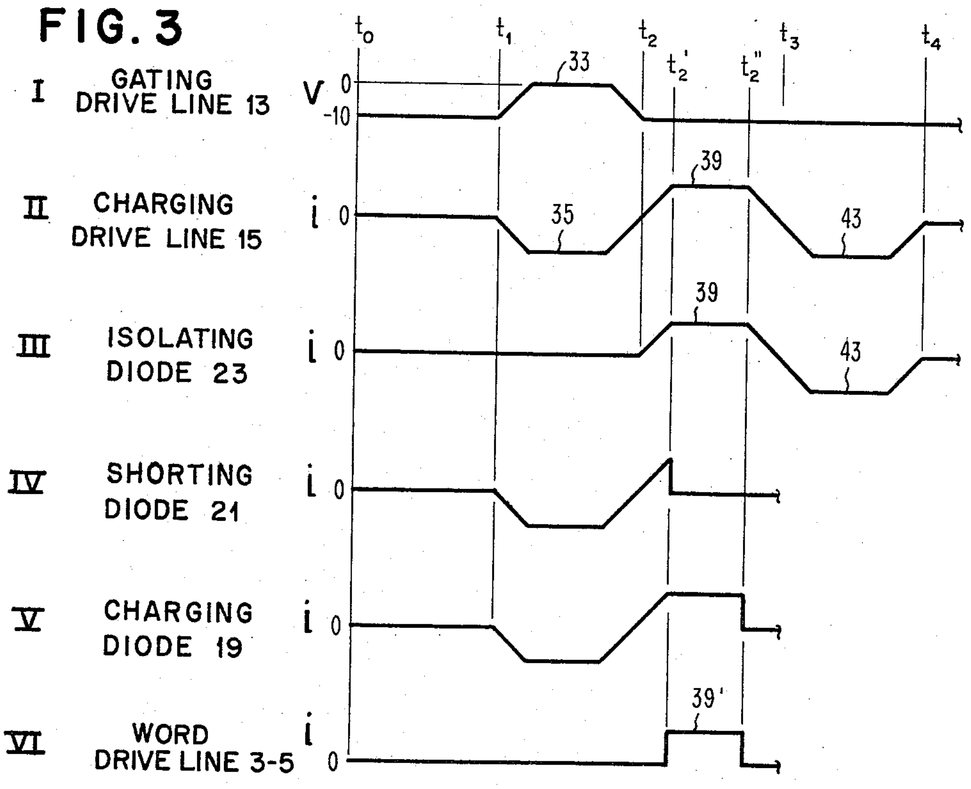
FIG. 3 is a diagram showing voltage and current waveforms to facilitate description of the diode gating arrangement of FIG. 2.

The operation of a gating arrangement 17 as shown in FIG. 1 is more particularly illustrated and described with respect to FIG. 2 and the curves of FIG. 3. In one illustrative embodiment of this invention, each gating arrangement 17 of a matrix selection switch comprises a slow-recovery charging diode 19 and a fast-recovery shorting diode 21 connected between gating and charging drive lines 13 and 15 and poled in a same direction. Also, a fast-recovery isolating diode 23 is connected at junction 31 of the charging diode 19 and shorting diode 21; the cathode of diode 23 is connected to an associated word drive line 3–5 threading a column of cores 1 defining the corresponding word address. Shorting diode 21 and isolating diode 23 are poled oppositely with respect to the charging diode 19.

During the quiescent state, gate drivers 25 and charge and word drivers 27 and 29 establish voltage levels along gating and charging drive lines 13 and 15, respectively, to maintain charging diodes 19 and shorting diodes 21 in a reverse biased condition and, therefore, each gating arrangement 17 disabled. Quiescent operation of the matrix selection switch, for example, is indicated in FIG. 3 as the time interval $t_0$–$t_1$, gating and charging drive lines 13 and 15 are maintained at a −10 volts and +2 volts, respectively.

The operation of READ and WRITE matrix selection switches R and W to energize a selected read drive line 3 and write drive line 5, respectively, are substantially identical and consist of sequential charging and driving phases. Accordingly, word drive line 3–5 illustrated in FIG. 2 is representative of both word and drive lines 3 and 5 of FIG. 1. To effect a charging phase of a READ or a WRITE operation preparatory to the energization of word drive line 3–5, appropriate gate driver 25 and charge driver 27 are concurrently operated at time $t_1$ to apply positive voltage and negative current pulses 33 and 35, respectively, along gating and charging drive lines 13 and 15, respectively. During time interval $t_1$–$t_2$, therefore, charging diode 19 and shorting diode 21 conduct the negative or charging current pulse 35 in a forward direction as indicated by arrow 37, the resulting negative voltage at junction 31 maintains isolating diode 23 in a reversed biased state whereby word drive line 3–5 is undisturbed. At the termination of the charging cycle at time $t_2$, gate driver 25 and charge driver 27 are disabled, and charging and shorting diodes 19 and 21 are reverse biased. As hereinabove mentioned, shorting diode 21 exhibits fast-recovery characteristics and immediately exhibits high reverse impedance; charging diode 19, on the other hand, is "charged" due to the presence of free minority carriers in the base region. The magnitude of the forward current during charging phase $t_1$–$t_2$ is particularly determined such that the number of free minority carriers, i.e. charge, stored in the base region of charging diode 19 are at least equal to the charge of the particular driving pulse, i.e. either full-select READ pulse or half-select WRITE pulse, to be applied along the word drive line 3–5.

Slow-recovery semiconductor diodes exhibit a low reverse impedance subsequent to a period of forward conduction due to a charge transfer phenomenon supported by free minority carriers in the base region. The magnitude of reverse current or charge transferred through a "charged" slow-recovery diode is limited by the number of free minority carriers in the base region. It can be appreciated that free minority carriers in the base region of charging diode 19 after time $t_2$ have a finite lifetime. Such free minority carriers can be satisfied by majority carriers existing in the base region or can be swept back into the anode region across the diode junction when the "charged" diode is reverse biased. For example, when "charged" charging diode 19 is reversed biased, energy levels in the base and anode regions are reversed and the flow of free minority carriers across the diode junction and into the anode region supports reverse current flow. The magnitude of instantaneous charge which can be transferred through the "charged" charging diode 19 in a reverse direction is dependent upon the number of free minority carriers in the base region.

During the driving phase of the READ or WRITE operation at time $t_2$, word driver 29 is operated during the recovery time of charging diode 19 to apply a positive current drive signal 39 along charging drive line 15. As gating drive line 13 is normalized, the resulting excursion of charging drive line 15 is operative to reverse bias charging diode 19 and shorting diode 21. Since charging diode 19 is "charged," free minority carriers in the base region support conduction of drive signal 39 in a reverse direction. The resulting voltage developed across shorting diode 21 is sufficient to forward bias isolating diode 23 to pass drive signal 39 as indicated by arrow 41 and shown in Curve III of FIG. 3. Current pulse 39 is determined to be of proper magnitude to energize the word drive line 3–5 to effect either a READ or WRITE operation, as known in the art. At the completion of the driving phase at time $t_3$, word driver 29 is disabled to terminate drive signal 39 and gating arrangement 17 reverts to a quiescent operation. At this time, the quiescent +2 volt level along charging drive line 15 is effective to sweep remaining free minority carriers from the base region of charging diode 19 to accelerate normalization of the gating arrangement 17.

It is to be appreciated that the operation of the READ and WRITE matrix selection switches R and W of FIG. 1 are identical but for the coincident energization of selected bit-sense line 7 with the operation of the latter. The selection of a particular word drive line 3–5 to be energized is effected during time interval $t_1$–$t_2$ by coincident energization of gating and charging drive lines 13 and 15 commoned to the corresponding gating arrangement 17. Unselected gating arrangements 17 in the matrix selection switch remain undisturbed or uncharged during both charging and driving phases as the charging diodes 19 included therein are each reversed biased by quiescent voltage levels maintained along either or both of the connected gating and charging drive lines 13 and 15; accordingly, the associated word drive lines 3 or 5 are effectively isolated and undisturbed. Also, during the driving phase at time interval $t_2$–$t_3$, drive signal 39 applied along the charging drive line 15 serves to further back bias charging diode 19 in each unselected gating arrangement 17. Also, charging diodes 19 in READ and WRITE matrix selection switches R and W of FIG. 1, respectively are selected such that the number of free minority carriers in the base region at time $t_2$ and during driving phase are at least sufficient to transfer the total charge of a full-amplitude READ signal or half-amplitude WRITE pulse, respectively.

When the number of free minority carriers in the base region are insufficient to transfer the entire applied charge, charging diode 19 immediately exhibits a high reverse impedance; the reverse cutoff transition of charging diode 19, i.e. which can be in the order of 2 nanoseconds, is essentially determined by the uniformity of dispersion of free minority carriers in the base region. In accordance with other aspects of this invention, the rise time of the drive signal applied along the associated word drive line 3–5 of FIG. 2 is reduced when a slow-recovery diode exhibiting a fast reverse cutoff transition is utilized for shorting diode 21; preferably, the slow-recovery diode 21 has a recovery time equal to or slightly in excess of the rise time $t_2$–$t_2'$ of drive signal 39, for example, 10 nanoseconds, of a given magnitude. Also, the decay time of drive signal 39 can be reduced when charging diode 19 is selected to exhibit a substantially discontinuous cutoff transition and have a recovery time less than the duration of drive signal 39. As hereinafter described, the respective recovery times of charging diode 19 and shorting diode 21 define the duration of drive signal applied along the associated word drive line 3–5. The reverse conduction characteristics of shorting diode 21 and charging diode 19 during time interval $t_2$–$t_3$ are illustrated in Curves IV and V, respectively, of FIG. 3; the resulting drive signal 39' applied along the associated word drive line is illustrated in Curve VI of FIG. 3. Accordingly, during the charging phase $t_1$–$t_2$, both charging diode 19 and shorting diode 21 conduct in a forward direction as indicated by arrow 37 and are charged. At time $t_2$, drive signal 39 is applied along charging drive line 15 to effect the driving phase, charging and shorting diodes 19 and 21, respectively, are biased to conduct in a reverse direction. During the recovery time of shorting diode 21, junction 31 is effectively clamped along the low reverse impedance of diode 21 to the quiescent voltage level along gating drive line 13. Accordingly, during time interval $t_2$–$t_2'$, isolating diode 23 is reverse biased and the associated word drive line 3–5 is not energized. At time $t_2'$, since the number of minority carriers remaining in the base region of shorting diode 21 are insufficient to support the charge transfer phenomenon, shorting diode 19 immediately reverts to a high reverse impedance condition. The accompanying voltage rise at junction 31 at time $t_2'$ forward biases the isolating diode 23 whereby reverse current through charging diode 19 is passed therethrough in a forward direction and energizes the associated word drive line. As shown in Curve VI, the leading edge of the resultant drive signal 39' along the associated word drive line 3–5 is essentially determined by the reverse cutoff transition of shorting diode 21. When the duration of gate pulse 33 extends beyond time $t_2$, a more effective shorting path is defined during the rise line and drive pulse 39.

Similarly, the decay time of drive signal 39' applied along the associated word drive line 3–5 is reduced when the charging diode 19 reverts to a high reverse impedance condition at time $t_2''$. The accompanying voltage drop at junction 31 is effective to reverse bias isolating diode 23 to deenergize the associated word drive line 3–5, the trailing edge of drive signal 39'' being determined by the reverse cutoff transition of charging diode 19. At time $t_2''$–$t_3$, the net result of current pulse 39 along charging drive line 15 is to further reverse bias each of the gating arrangements 17 multipled thereto whereby no magnetic disturbances are generated within the core array.

In accordance with other aspects of this invention, a gating arrangement 17 can be modified to sequentially pass bipolar signals whereby a single matrix selection switch is operable to effect sequentially both READ and WRITE operations. To achieve such result, a slow-recovery diode is also employed as isolating diode 23 which, for example, can have a smaller charge capacity than charging diode 19. Accordingly, during a preceding drive cycle $t_2$–$t_3$, isolating diode 23 is charged by the forward conduction of negative current drive signal 39 and charging diode 19 reverts to a high reverse impedance condition. At time $t_3$, word driver 29 is operated to apply a reverse polarity or negative drive signal 43 along charging drive line 15. At this time charging diode 19 is forward biased and shorting diode 21 is maintained reverse biased by the quiescent voltage level along gating drive line 13. The resulting forward current through charging diode 19 as indicated by arrow 41' of FIG. 2 is conducted as reverse current through isolating diode 23 during the time interval $t_3$–$t_4$. Accordingly, a WRITE operation can be effected when selected bit-sense lines 7 are concurrently energized during time interval $t_3$–$t_4$. When a gating arrangement 17 is thus modified, it is to be noted that a single charging phase is required to charge the selected gating arrangement 17 to pass bipolar pulses.

Figure 4:
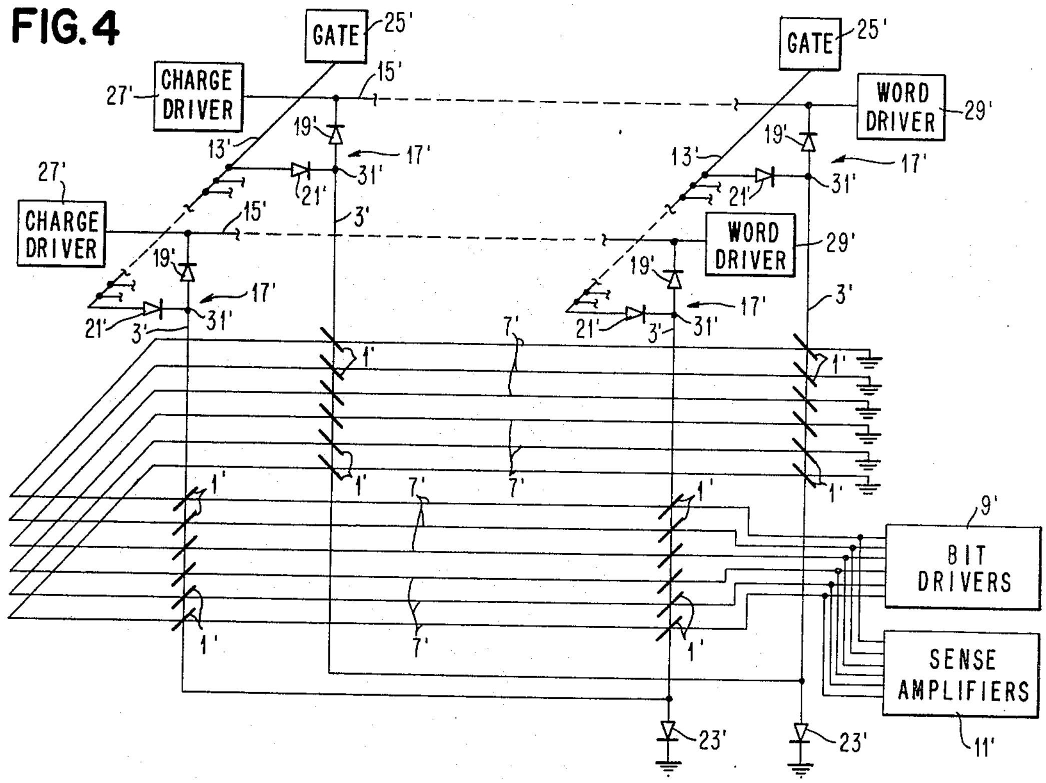
FIGS. 4 and 5 are alternate embodiments of matrix selection switches in accordance with this invention.
Figure 5:
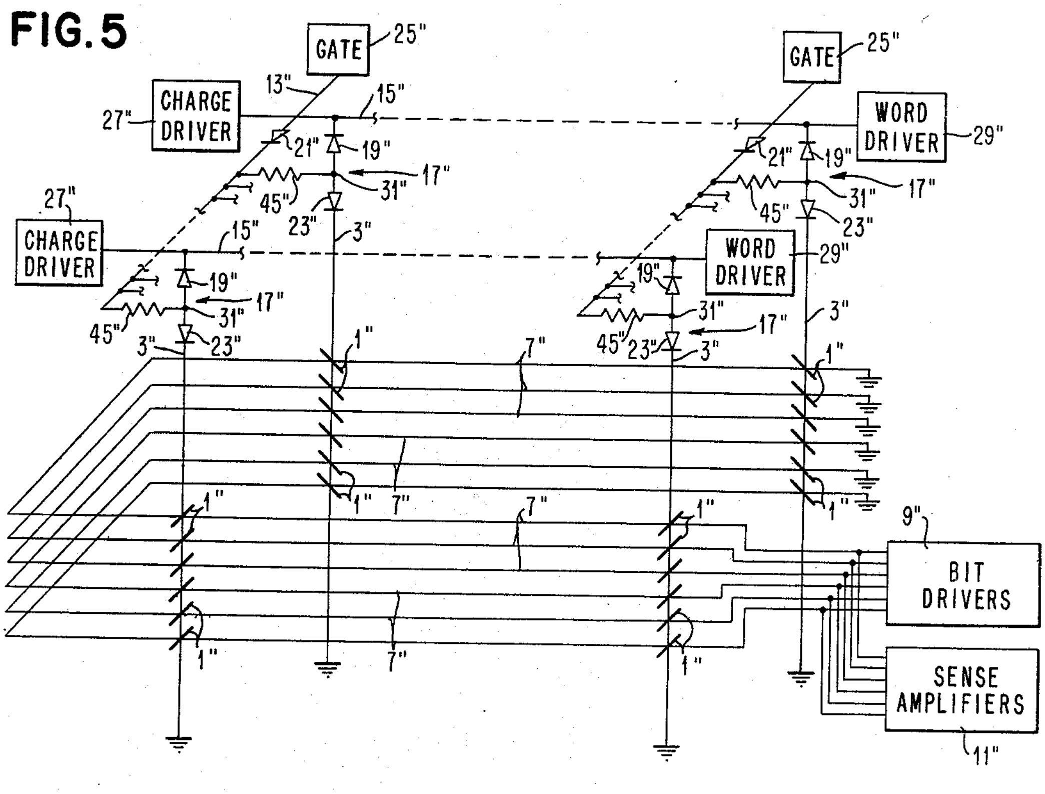

In accordance with other aspects of this invention, the number of semiconductor diode devices in a single matrix selection switch are substantially reduced by employing a common shorting and/or a common isolating diode for each row of gating arrangements 17. For example, and as shown in FIG. 4, junctions 31' of gating arrangements 17' in a READ matrix selection switch connected to a single charging drive line 15' are connected along the associated word drive line 3' and multipled to ground through a common isolating diode 23'; also, and as shown in FIG. 5, junction 31'' of gating arrangements 17'' arranged in a row are connected through isolating resistors 45'' and multipled through a common shorting diode 21'' to a gating drive line 13''. The operation of the matrix selection switches illustrated in FIGS. 4 and 5, respectively, are substantially as hereinabove described, with respect to FIGS. 1 and 2 corresponding structures being identified by primed and double primed reference characters. Referring to FIG. 4, when appropriate gating and charging drive lines 13' and 15' are energized at time $t_1$–$t_2$ to effect a driving phase, the charging current path is traced through charging diode 19' and shorting diode 21'; during the driving phase at time $t_2$–$t_3$, drive signal 39 applied along charging drive line 15' is passed as reverse current through charging diode 19', as hereinabove described, and as forward current through the common isolating diode 23' to energize the associated word drive line 3'. At this time, disturbances reflected along remaining word drive lines 3' multipled to the common isolating diode 23' are minimal. Also, with respect to the embodiment shown in FIG. 5, the charging current path during the driving phase is traced through charging diode 19'', isolating resistor 45'', and the common shorting diode 21'' at time interval $t_1$–$t_2$; at this time, each of the isolating diodes 23'' connected to the common shorting diode 21'' are reversed biased so as to effectively isolate the associated word drive line 3''. During the driving phase at time $t_2$–$t_3$, however, drive signal 39 applied along charging drive line 15'' is passed as reverse current through charging diode 19''. Isolating resistors 45'' are of sufficient ohmic value to effectively isolate the unselected gating arrangements 17'' during the driving phase such that only isolating diode 23'' in the selected gating arrangement is forward biased to energize the associated word drive line 3''. It is to be appreciated that the matrix selection switches shown in FIGS. 5 and 6, respectively, can be modified in accordance with the above-described aspects of this invention so as to achieve pulse sharpening and, in addition, to direct bipolar signals along the associated word drive line 3 to effect sequential READ and WRITE operations.

While the invention has been particularly shown and described with reference to preferred embodiments thereof, it will be understood by those skilled in the art that various changes in form and details may be made therein without departing from the spirit and scope of the invention.

What is claimed is:

1. A matrix switching arrangement comprising a plurality of diode gating arrangements each including at least a first semiconductor storage diode device exhibiting a finite recovery time, a plurality of load means connected one to each of said gating arrangements, supply means connected to said gating arrangements for supplying signals of predetermined polarity to be distributed among said load means on a selected basis, said first diode devices being poled to exhibit high reverse impedance to said signals of said predetermined polarity, first means defining a coordinate array for inducing forward conduction through said first diode device in only that gating arrangement connected to a selected one of said load means so as to define a charging phase, said supply means operative during the recovery time of said first diode device in the said gating arrangement connected to said selected load means, and means for isolating said load means and said gating arrangements during said charging phase.

2. A switching arrangement as defined in claim 1 wherein said isolating means comprises a second semiconductor diode device oppositely poled with respect to said first diode devices and multipled in series arrangement with said first diode devices and said load means.

3. A switching arrangement as defined in claim 1 wherein said isolating means includes a plurality of second semiconductor diode devices oppositely poled with respect to said first diode devices and each connected in series arrangement with said first diode devices and said connected load means.

4. A switch arrangement as defined in claim 1 wherein said first means includes circuit means for defining forward conduction paths for said first diode devices in each of said gating arrangements, each of said forward conduction paths thus defined being multipled to a third semiconductor diode device similarly poled with respect to said first diode devices.

5. A switching arrangement as defined in claim 1 wherein said first means includes circuit means for defining forward conduction paths for said first diode devices in each of said gating arrangements, each of said forward conduction paths thus defined including a third semiconductor diode device connected intermediate said first diode device in said each gating arrangements and said connected load means, said third diode devices being similarly poled with respect to said first diode devices.

6. A switching arrangement as defined in claim 1 wherein said isolating means includes a plurality of second semiconductor diode devices oppositely poled with respect to said first diode devices and each connected in series arrangement with said first diode devices and said connected load means, and said first means includes circuit means for defining forward conduction paths for said first diode devices in each of said gating arrangements, each of said forward conduction paths thus defined including a third semiconductor connected intermediate said first and said second diode devices and similarly poled with respect to said first diode device.

7. The switching arrangement of claim 1, wherein said isolating means are a plurality of semiconductor storage diodes having a finite recovery time less than of said first semiconductor storage diode.

8. A matrix selection switch comprising a plurality of charging drive lines and a plurality of gating drive lines arranged in coordinate fashion to define a plurality of crosspoints, a plurality of diode gating arrangements interconnecting said charging and said gating drive lines at each of said crosspoints, a plurality of load means connected one to each of said gating arrangements, each of said gating arrangements including a first semiconductor diode device having a finite recovery time and a second semiconductor diode device connected in tandem between said gating and said charging drive lines and also a third semiconductor diode device connecting the junction of said first and said second diode devices and said load means, said second and said third diode devices poled to conduct forward and reverse current, respectively, directed through said first diode device, first driver means for energizing said gating and said charging drive lines on a coordinate basis to induce forward conduction along said first and said second diode devices in a selected one of said gating arrangements so as to define a charging phase, said third diode device being reversed biased during the charging phase to isolate said connected load means, and second driver means for energizing said previously-energized charging drive line during said finite recovery time to induce reverse conduction through said first diode device in said selected gating arrangement such that forward conduction is induced along said third diode device, the load means connected to said selected gating arrangement being energized.

9. In a matrix selection switch as defined in claim 8 wherein said second driver means is operative to apply pulses of predetermined rise time and duration along said previously energized charging drive line and wherein said second diode devices are selected to exhibit a finite recovery time substantially equal to said rise time of said applied pulses.

10. In a matrix selection switch as defined in claim 9 wherein said first diode devices are selected to exhibit a recovery time substantially equal to the duration of said applied pulses.

11. A gating arrangement responsive to the application of a first polarity pulse and second polarity pulse in predetermined sequence comprising multiple independent input points which are variable with respect to each other and with respect to a fixed point of reference potential, a first input point providing first polarity pulses and a second input point providing second polarity pulses, load means responsive to said first polarity pulses, first and second semiconductor diode devices poled in opposite phase relationship and connected in tandem between said first input point of first polarity pulses and said load means, said first diode device having a finite recovery time and being connected to said first and said second input points and poled to present a high reverse impedance to said first polarity pulses, said second diode device being connected to said load, charging means including a third semiconductor diode device connected intermediate said first and said second diode devices and poled in a same direction as said first diode device, said charging means cooperative with said second input point to forward bias said first and said third diode devices whereby the resultant forward current charges said first diode device, said first input point supplying said first polarity pulses during the recovery time of said first diode device wherein said first diode device exhibits a low reverse impedance to said first polarity pulses whereby said load means is energized.

12. A gating arrangement having multiple input points which are independently variable in potential with respect to each other and with respect to any other point of reference potential within said arrangement, said arrangement including a first semiconductor diode having a finite recovery time and multiplied to a second and a third semiconductor diode device, said second and said third diode devices being oppositely-poled and similarly-poled, respectively, with respect to said first diode device, a source of first polarity signals and a source of second polarity signals each being connected to a first one of said input points, said sources being connected to the terminal of said first diode device that is not common to the second and third diode device, said first diode device poled to exhibit a high reverse impedance to said first polarity signals, and means connected to said third diode device and to a second input point cooperative with said source of second polarity signals to forward bias said first and said third diode devices whereby forward currents induced therethrough are sufficient to charge said first diode device, said source of first polarity signals operative during the recovery time of said first diode device to induce reverse conduction through said first diode device, said connected means being cooperative to maintain said third diode device in a high impedance state whereby said second diode device is forward biased and said load means is energized.

13. An apparatus for passing bipolar pulses through a load comprising, in combination, a source of drive signals of first and second polarity, a gating arrangement including first and second semiconductor diode devices poled in opposite phase relationship and connected in tandem between said source and said load, said first diode device being a storage diode exhibiting a finite recovery time and poled to exhibit a high reverse impedance to pulses of said first polarity, and said second diode also being a storage diode exhibiting a finite recovery time, diode charging means connected across said first diode device for inducing forward conduction therethrough for charging said first diode device, said source being operative during the finite recovery time of said first diode device to supply pulses of said first polarity to which said first diode device exhibits a low reverse impedance whereby said load is energized, said second diode device being effective to isolate said load during the charging phase of said first diode device and being charged in a forward direction when said source delivers pulses of said first polarity, wherein said second device exhibits low reverse impedance to pulses delivered by said source which are of said second polarity.

14. The apparatus of claim 11, wherein the finite recovery time of said second diode device is less than the finite recovery time of said first diode device.

References Cited

UNITED STATES PATENTS

| | | | |
|---|---|---|---|
| 2,823,321 | 2/1958 | Sims | 307—88.5 |
| 3,184,605 | 5/1965 | Herzog | 307—88.5 |
| 3,244,908 | 4/1966 | Lo Casale et al. | 307—88.5 |
| 3,250,922 | 5/1966 | Parkam | 307—88.5 |
| 3,271,746 | 9/1966 | Narud et al. | 307—88.5 |

| | | | |
|---|---|---|---|
| 2,618,753 | 11/1952 | Van Mierlo | 340—176 X |
| 2,657,318 | 10/1953 | Rack | 340—176 |
| 2,908,830 | 10/1959 | Mason et al. | 307—88.5 |
| 2,981,891 | 4/1961 | Horton | 307—88.5 |
| 2,997,659 | 8/1961 | Abbott et al. | 307—88.5 |
| 3,021,511 | 2/1962 | Vinal | 340—166 |
| 3,039,082 | 6/1962 | Spencer | 307—88.5 |
| 3,119,095 | 1/1964 | Hansen | 340—176 |
| 3,200,267 | 8/1965 | Cubert | 307—88.5 |
| 3,225,220 | 12/1965 | Cubert | 307—88.5 |
| 3,231,753 | 1/1966 | Brown | 340—174 |

OTHER REFERENCES

International Solid State Circuit Conference, 1958.

Kintner, P. M.: "A Simple Method of Designing NOR Logic," Control Engineering, February 1963, pp. 77–79.

JOHN S. HEYMAN, Primary Examiner

H. A. DIXON, Assistant Examiner

U.S. Cl. X.R.

307—258, 259, 319